United States Patent [19]

van Kemenade et al.

[11] Patent Number: 4,727,283
[45] Date of Patent: Feb. 23, 1988

[54] LOW-PRESSURE MERCURY VAPOUR DISCHARGE LAMP

[75] Inventors: Johannes T. C. van Kemenade; Gerardus H. M. Siebers; Jean J. Heuvelmans; Johannes T. W. deHair, all of Eindhoven; Johannes W. ter Vrugt, Geldrop, all of Netherlands

[73] Assignee: U.S. Philips Corporation, New York, N.Y.

[21] Appl. No.: 883,186

[22] Filed: Jul. 8, 1986

[30] Foreign Application Priority Data

Jul. 15, 1985 [NL] Netherlands ............ 8502025

[51] Int. Cl.⁴ .............................. H01J 61/46
[52] U.S. Cl. .................. 313/487; 252/301.4 R
[58] Field of Search ............ 252/301.4 R, 582, 584, 252/586, 301.4 P; 313/483, 486, 487, 485; 315/57

[56] References Cited

U.S. PATENT DOCUMENTS

| | | | |
|---|---|---|---|
| 3,937,998 | 2/1976 | Verstegen et al. | 313/487 |
| 4,024,070 | 5/1977 | Schuil | 252/301.4 R |
| 4,177,401 | 12/1979 | Yamane et al. | 313/485 |
| 4,314,910 | 2/1982 | Barnes | 252/301.4 R |
| 4,383,200 | 5/1983 | Van Zon et al. | 315/57 |
| 4,447,756 | 5/1984 | Kohmoto et al. | 313/487 |
| 4,559,470 | 12/1985 | Murakami et al. | 313/485 |

Primary Examiner—David K. Moore
Assistant Examiner—Mark R. Powell
Attorney, Agent, or Firm—John C. Fox

[57] ABSTRACT

A low-pressure mercury vapor discharge lamp with a luminescent layer whose emission mainly lies in three spectral ranges and whose loading amounts to at least 500 W per m² surface area of the luminescent layer, is characterized by having an absorption layer of a luminescent aluminate activated by trivalent cerium and having a garnet crystal structure. The absorption layer permits the obtaining of low color temperatures (down to 2000 K.).

18 Claims, 2 Drawing Figures

LOW-PRESSURE MERCURY VAPOUR DISCHARGE LAMP

BACKGROUND OF THE INVENTION

The invention relates to a low-pressure mercury vapour discharge lamp, whose emission mainly lies in three spectral ranges and of which the colour temperature of the emitted light lies in the range of 2000–3000 K., this lamp being provided with a gas-tight discharge envelope transparent to radiation and having a gas filling comprising mercury and a rare gas and with a luminescent layer comprising luminescent materials whose emission mainly lies in the range of 590–630 nm and in the range of 520–565 nm, whilst further means are provided for maintaining a column discharge in the gas filling, the power consumed by the column being at least 500 W/m² surface area of the luminescent layer.

Low-pressure mercury vapour discharge lamps, whose emission mainly lies in three spectral ranges, also designated as three-band fluorescent lamps, are known from U.S. Pat. No. 4,176,294 and from Netherlands Patent Specification No. 164,697. These lamps are commonly used in general illumination and have the advantage that they have both a good general colour rendition (colour rendition index R(a, 8) of at least 80) and a high luminous efficacy (up to values of 90 lm/W and higher). This is possible because the emission of these lamps is mainly concentrated in three comparatively narrow spectral bands. For this purpose the lamps contain a red luminescing material whose emission mainly lies in the range of 590–630 nm and a green luminescing material whose emission mainly lies in the range of 520–565 nm. The required emission in the third spectral range, i.e. the range of 430–490 nm, is supplied in many cases by a blue luminescing material. However, the visible radiation emitted by the mercury vapour discharge itself also provides a contribution (i.e. the emission of the 436 nm mercury line) in this spectral range. The lamps emit white light at a given colour temperature, that is to say that the colour point (x,y in the CIE colour coordinate diagram) of the emitted radiation lies on or near the line of the black body radiators. The colour point of fluorescent lamps of low colour temperature is generally chosen to lie preferably slightly above (for example about 0.010 in y coordinate) the line of the black body radiators.

A desired colour temperature of the light emitted by a three-band fluorescent lamp is obtained by a suitable adjustment of relative contributions in the three spectral ranges to the overall emission of the lamp. As the colour temperature of the lamp is lower, the contribution in the blue range of 430–490 nm should be smaller. It follows from the aforementioned Netherlands Patent Specification No. 164,697 that the minimum attainable colour temperature for lamps having an inner diameter of the tubular discharge envelope of about 36 mm is about 2300 K., in which event the lamp need no longer contain a blue luminescing material and all the required radiation in the blue spectral range originates from the blue mercury radiation. In lamps having a smaller inner diameter of the discharge envelope, especially a diameter of about 24 mm, the mercury vapour discharge is found to be more efficient the relative contribution of the blue mercury line being larger. Consequently for these lamps, the minimum attainable colour temperature is found to have a higher value, i.e. about 2500 K.

Three-band fluorescent lamps of the kind mentioned in the opening paragraph are known, for example, from U.S. Pat. Nos. 4,335,330; 4,199,708; and 4,374,340, and are generally of very compact construction and intended to replace incandescent lamps. Due to their compact construction, the luminescent layer in these lamps is heavily loaded, that is to say, the power consumed by the column during operation of the lamp is at least 500 W per m² of surface area of the luminescent layer. This is considerably higher than the load of the luminescent lamp layer in the aforementioned lamps having an inner diameter of about 36 and 24 mm, respectively, which load has a value of the order of 300 and 400 W/m², respectively. It has been found that in these heavily loaded lamps the relative contribution of the blue mercury radiation is even higher, and that such lamps without a blue luminescing material have a colour temperature of the emitted light of at least about 2700 K. at colour points lying on the line of the black body radiators. As a result of this, and also of their high R(a, 8), these lamps are suitable to replace incandescent lamps.

Hitherto, incandescent lamps have been mainly used for interior illumination. With a view to saving energy, it is often desirable to replace incandescent lamps with fluorescent lamps. A typical value of the colour temperature of an incandescent lamp is 2650 K. However, the use of colour lamps (for example the so-called flame lamps) and dimmers in interior illumination result in colour temperatures down to about 2000 K. A disadvantage of the aforementioned heavily loaded fluorescent lamps is that due to the intense blue mercury radiation they cannot be used in the frequently desired colour temperature range of about 2000 to about 2700 K.

The invention has for its object to obviate the said disadvantage and in general to provide means for shifting the colour point of heavily loaded three-band fluorescent lamps and for reducing the colour temperature, while substantially maintaining the good general colour rendition and the high relative luminous flux.

SUMMARY OF THE INVENTION

A low-pressure mercury vapour discharge lamp of the kind described in the opening paragraph is characterized according to the invention in that the lamp is provided with an absorption layer comprising an aluminate activated by trivalent cerium and having a garnet crystal structure.

The said garnet is a known luminescent material (See for example J.O.S.A., 59, No. 1, 60, 1969), which absorbs short-wave ultraviolet radiation, but especially absorbs radiation having a wavelength between about 400 and 480 nm and converts it into radiation in a wide emission band (half-value width of about 110 nm) with a maximum at about 560 nm. It has been found that the use of such a luminescent garnet in an absorption layer for three-band fluorescent lamps leads to a shift of the colour point of the radiation emitted by the lamp and allows for a reduction of the colour temperature of the lamp.

A reduction of the colour temperature in itself could be attained with any yellow pigment absorbing blue radiation. However, a yellow pigment leads to a reduction (unacceptable for this lamp type) of the relative luminous flux so that it cannot be used.

The use of the luminescent garnet in lamps according to the invention has the advantage that the absorbed radiation is no lost, but is converted with a high efficiency into visible radiation so that high relative luminous fluxes are obtained. In addition, the lamps according to the invention have high values of R(a, 8), which could not be expected because it is known for three-band fluorescent lamps that radiation in the range of 565–590 nm, in which a comparatively large part of the emission of the garnet is found, is detrimental to the colour rendition properties.

A preferred lamp according to the invention is characterized in that the luminescent aluminate having a garnet structure corresponds to the formula $Ln_{3-x}Ce_x Al_{5-p-q}Ga_pSc_qO_{12}$, in which Ln is at least one of the elements yttrium, gadolinium, lanthanum and lutetium and in which $0.01 \leq x \leq 0.15$
$0 \leq p \leq 3$ and
$0 \leq q \leq 1$.

As appears from the formula and conditions, in the garnet one or more of the elements Y, Gd, La and Lu may be used as the cation Ln and the aluminium may be partly replaced within the aforementioned limits by gallium and/or scandium. The Ce activator replaces part of the Ln and is present in a concentration x of 0.01 to 0.15. Ce contents lower than 0.01 lead to materials having an insufficient blue absorption, while for Ce contents higher than 0.15 the garnet is formed insufficiently and undesired subphases may be obtained.

Preferably, such a lamp according to the invention is characterized in that in the garnet Ln is yttrium and in that the garnet does not contain Ga and Sc($p=q=0$). Such materials in fact have the most favourable absorption properties and supply the highest luminous fluxes.

In an embodiment of a lamp according to the invention, the absorption layer is disposed on the outer surface of the discharge envelope. This has the advantage that the mercury resonance radiation produced in the lamp is utilized to the optimum and the absorption layer only absorbs the undesired blue radiation and converts it into visible radiation. In general, such a lamp will be provided with protection, for example an outer bulb, or will be used in a closed luminaire.

Another embodiment of a lamp according to the invention is characterized in that the absorption layer is disposed on the inner surface of the discharge envelope and in that the luminescent layer is disposed on the side of the absorption layer facing the discharge. In this lamp, the mercury resonance radiation will mainly be absorbed by the luminescent layer. The use of an outer bulb or a closed luminaire is not necessary for this lamp.

Another embodiment of a lamp according to the invention is characterized in that the garnet activated by trivalent cerium is mixed with the luminescent materials of the luminescent layer so that the luminescent layer is at the same time the absorption layer. Such a lamp can in fact be manufactured in a simple manner because the absorption layer and the luminescent layer can be introduced into the lamp in a single operation.

In a particularly advantageous embodiment a lamp according to the invention comprises a discharge envelope, a ballast unit and an ignition unit, and optional reflectors, all in a common envelope consisting of a bottom portion comprising a cap and an outer bulb transparent to radiation, and is characterized in that an absorption layer is disposed on at least parts of the surface of the ballast unit and/or ignition unit and/or of the bottom portion and/or the reflectors.

BRIEF DESCRIPTION OF THE DRAWINGS

Embodiments of lamps according to the invention will now be described more fully with reference to the drawing in which.

DESCRIPTION OF THE PREFERRED EMBODIMENTS

Figure 1:
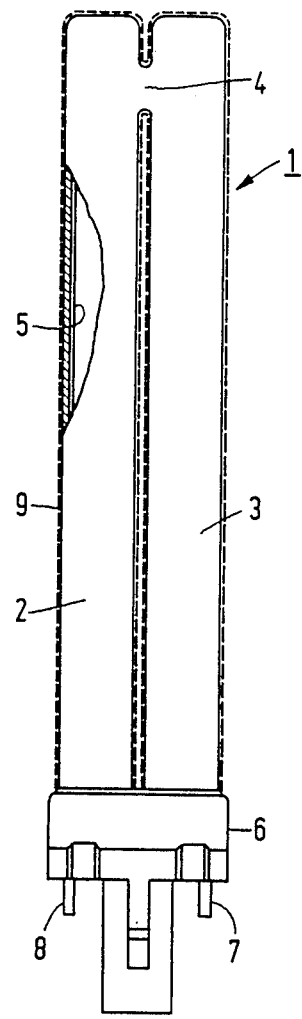
FIG. 1 shows in elevation and partly broken away a low-pressure mercury vapour discharge lamp comprising two parallel tube portions interconnected by a coupling tube.

The lamp shown in FIG. 1 comprises a glass discharge envelope 1 sealed in a gas-tight manner and comprising two parallel tube portions 2 and 3 interconnected by a coupling tube 4. The discharge envelope 1 contains a small quantity of mercury and argon at a pressure of 400 Pa and is further provided at its inner surface with a luminescent layer 5. The layer 5 comprises a red luminescing yttrium oxide activated by trivalent europium and a green luminescing terbium-activated cerium magnesium aluminate. An electrode (not shown in the drawing) is arranged at each of the ends of the tube portions 2 and 3 remote from the coupling tube 4 and these electrodes constitute the means for maintaining a column discharge in the gas filling. The ends of the tube portions 2 and 3 located near the electrodes are connected to a lamp base 6, which carries two current-supply pins 7 and 8 and in which a glow starter (not shown) is arranged. The discharge envelope 1 is coated throughout its outer surface with a thin absorption layer 9 of yttrium aluminate activated by trivalent cerium having a garnet structure. The inner diameter of the tube portions 2 and 3 is 10 mm and the length of the U-shaped discharge path is about 200 mm. During operation, the lamp comsumes a power of 9 W and the load of the luminescent layer 5, i.e. the power consumed by the column divided by the surface area of the luminescent layer 5, is about 1350 W/m².

Figure 2:
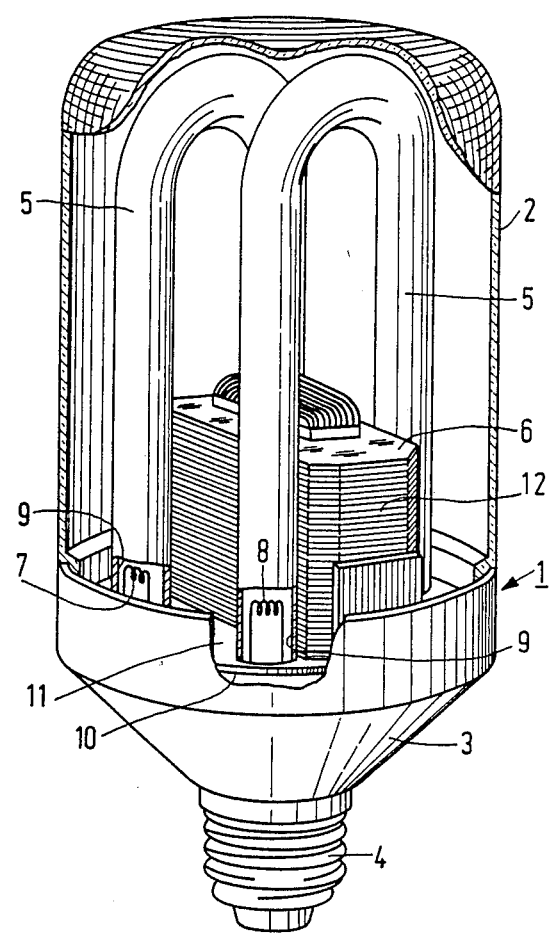
FIG. 2 shows diagrammatically a low-pressure mercury vapour discharge lamp capped on one end, which is suitable to replace incandescent lamps.

The lamp of FIG. 2 has an envelope 1 comprising a glass outer bulb 2 and a bottom portion 3, which is connected to the bulb and is provided with a cap in the form of an E 27 lamp base 4. In the envelope 1 are arranged a discharge bulb 5, a ballast unit 6 and an ignition unit (not shown in the drawing) provided in the bottom portion 3. The discharge bulb 5 comprises a glass tube having an inner diameter of 9.5 mm, this tube being bent into the shape of a hook comprising four adjacent parallel extending tube portions interconnected by three curved tube portions. The discharge bulb 5 contains a small quantity of mercury and an amalgam and a mixture of argon and neon at a pressure of 300 Pa. Electrodes 7 and 8, respectively, are arranged at the ends of the bulb 5 and the inner surface of the bulb 5 is provided with a luminescent layer 9 comprising red and green luminescing materials of the type mentioned in FIG. 1. The bulb 5 is arranged with its free ends in a bottom plate 10, which is secured in the bottom portion 3. The bottom plate 10 and the ballast unit 6 are coated with thin absorption layers 11 and 12, respectively, of cerium-activated yttrium aluminate. The lamp consumes during operation a power of 18 W. The length of the curved discharge path is about 390 mm and the power consumed by the column divided by the surface area of the luminescent layer 9 has a value of 1250 W/m².

EXAMPLES 1 TO 4

Four lamps (designated 1 through 4) of the type described with reference to FIG. 1 (9 W) were provided with a thin uniform absorption layer of cerium-activated garnet according to the formula $Y_{2.9}Ce_{0.1}Al_5O_{12}$, which layer was disposed on the outer surface of the discharge bulb. For each lamp a different layer thickness was used. In the following Table I, the overall mass of the garnet used in the absorption layer (A in mg), the colour point (x,y) of the light emitted by the lamp and the luminous flux obtained (L in lumen) are indicated for each of these lamps. For comparison, (x, y) and L were measured on a lamp designated a) without an absorption layer, but otherwise identical to the lamps 1-4. These value also indicated.

TABLE I

| example | A (mg) | x | y | L (lm) |
|---|---|---|---|---|
| a | 0 | 0.457 | 0.411 | 564 |
| 1 | 59 | 0.468 | 0.429 | 558 |
| 2 | 72 | 0.470 | 0.434 | 542 |
| 3 | 80 | 0.473 | 0.439 | 542 |
| 4 | 150 | 0.483 | 0.450 | 536 |

It clearly appears that with increasing thickness of the absorption layer an increasing shift of the colour point occurs, where total $\Delta y = 1.5\Delta x$. The colour temperature of the light emitted by the lamp a is about 2750 K and the colour point lies substantially on the line of the black body radiators.

If now in the luminescent layer of the lamps 1-4 the ratio of the quantity of red luminescing material to the quantity of the green luminescing material is enlarged (this ratio must be larger as the absorption layer is thicker) so that the colour point of the lamp shifts to an area on or near the line of the black body radiators, a colour temperature is attained of about 2400, 2340, 2200 and 2000 K for the lamps 1-4, respectively.

EXAMPLES 5 TO 7

Three lamps (5, 6 and 7) of the kind shown in FIG. 1 (9 W), but without an outer absorption layer, were coated on the inner side of the discharge bulb with varying thicknesses of an absorption layer of cerium-activated garnet according to the formula $Y_{2.9}Ce_{0.1}Al_5O_{12}$. On this absorption layer, a luminescent layer consisting of a mixture of red luminescing $Y_2O_3$-$Eu^{3+}$ and green luminescing $CeMgAl_{11}O_{19}$-Tb is provided. In the following Table II, for each lamp the mass of the absorption layer (A in mg), the colour point (x, y), the general colour rendering index R (a, 8), the luminous flux at 0 hours ($L_0$ in 1 m) and the luminous flux after 1000 operating hours ($L_{1000}$ in 1 m) are indicated. For comparison, these values are also indicated for the lamp a without an absorption layer.

TABLE II

| ex. | A (mg) | x | y | R (a,8) | $L_o$ (lm) | $L_{1000}$ (lm) |
|---|---|---|---|---|---|---|
| a | 0 | 0.457 | 0.411 | 82 | 564 | 502 |
| 5 | 25 | 0.466 | 0.423 | 81 | 573 | 502 |
| 6 | 50 | 0.475 | 0.436 | 81 | 566 | 505 |
| 7 | 75 | 0.480 | 0.444 | 80 | 566 | 513 |

It is again seen that the absorption layer leads to a shift of the colour point by about $\Delta y = 1.5\Delta x$. The lamps 5, 6, and 7 all had a luminescent layer with the same ratio of the quantity of red luminescing material to that of the green luminescing material as the lamp a, which has a colour temperature of about 2750 K. A small enlargement of this ratio yields for the lamp 5 a colour point near the line of the black body radiators, in which event the colour temperature is about 2500 K. In a corresponding manner, even lower colour temperatures (down to about 2000 K.) can be attained for the lamps 6 and 7.

EXAMPLE 8

A lamp (8) of the kind described with reference to FIG. 2 (18 W) was provided with a $Y_{2.9}Ce_{0.1}Al_5O_{12}$-containing absorption layer disposed on the bottom plate on the ballast unit and on the side of the upright edge of the bottom portion facing the discharge bulb. The lamp had a colour point of the emitted radiation $x=0.465$ and $y=0.417$, which is very close to the desired point ($x=0.468$ and $y=0.418$). An identical lamp, but without an absorption layer, had a colour point $x=0.461$ and $y=0.412$.

EXAMPLES 9 TO 11

Three lamps (9, 10 and 11) of the kind described with reference to FIG. 2 (18 W) were provided with a luminescent layer consisting of a mixture of green luminescing terbium-activated cerium magnesium aluminate (CAT), red luminescing yttrium oxide activated by trivalent europium (YOX) and cerium-activated garnet (YAG) according to the formula $Y_{2.9}Ce_{0.1}Al_5O_{12}$. In these lamps, the luminescent layer therefore also fulfilled the function of absorption layer. In the following Table III, the composition of the luminescent layer (in % by weight) of the colour point (x, y), the colour temperature ($T_c$ in K.), luminous efficacy ($\eta$ in 1 m/W) and the general colour rendition index R (a, 8) are indicated for these lamps.

TABLE III

| example | CAT % by weight | YOX % by weight | YAG % by weight | x | y | Tc (K) | η (lm/W) | R (a,8) |
|---|---|---|---|---|---|---|---|---|
| 9 | 30.8 | 66.5 | 2.7 | 0.477 | 0.414 | 2500 | 49.0 | 80 |
| 10 | 26.8 | 67.9 | 5.3 | 0.493 | 0.415 | 2325 | 48.4 | 82 |
| 11 | 23.0 | 68.1 | 8.9 | 0.508 | 0.415 | 2175 | 47.6 | 83 |

Finally, it should be noted that the luminescent layer of a lamp according to the invention may comprise besides a red luminescing and a green luminescing material also a small quantity of a blue luminescing material, as is also the case in three-band fluorescent lamps having a high colour temperature. In the present heavily loaded lamps, this can afford advantages because the blue luminescing material provides an additional degree of freedom for reaching a desired value of the colour point of the lamp.

What is claimed is:

1. A low-pressure mercury vapour discharge lamp, whose emission mainly lies in three spectral ranges and whose colour temperature of emission lies in the range of 2000–3000 K., the lamp comprising a gas-tight discharge envelope transparent to radiation and having a gas filling comprising mercury and a rare gas, a luminescent layer comprising luminescent materials whose emission mainly lies in the ranges of 590–630 nm and 520–565 nm, means for maintaining a column discharge in the gas filling, the power consumed by the column being at least 500 W per m$^2$ surface area of the luminescent layer, characterized in that the lamp is provided with an absorption layer comprising a luminescent aluminate activated by trivalent cerium and having a garnet crystal structure.

2. A lamp as claimed in claim 1, characterized in that the luminescent aluminate having a garnet structure corresponds to the formula $Ln_{3-x}Ce_xAl_{5-p-q}Ga_pSc_qO_{12}$, in which Ln is at least one of the elements yttrium, gadolinium, lanthanum and lutetium and in which $0.01 \leq x \leq 0.15$
$0 \leq p \leq 3$
$0 \leq q \leq 1$.

3. A lamp as claimed in claim 2, characterized in that Ln is yttrium and $p=q=0$.

4. A lamp as claimed in claim 3, characterized in that the absorption layer is disposed on the outer surface of the discharge envelope.

5. A lamp as claimed in claim 3, characterized in that the absorption layer is disposed on the inner surface of the discharge envelope and in that the luminescent layer is disposed on the side of the absorption layer facing the discharge.

6. A lamp as claimed in claim 3, characterized in that the garnet activated by trivalent cerium is mixed with the luminescent materials of the luminescent layer whereby the luminescent layer also is the absorption layer.

7. A lamp as claimed in claim 3, including a ballast unit and an ignition unit, which are arranged together with the discharge envelope in a common envelope consisting of a bottom portion comprising a cap and of an outer bulb transparent to radiation, characterized in that the absorption layer is disposed on at least parts of the surface of one or more of the ballast unit, the ignition unit and the bottom portion.

8. A lamp as claimed in claim 2, characterized in that the absorption layer is disposed on the outer surface of the discharge envelope.

9. A lamp as claimed in claim 1, characterized in that the absorption layer is disposed on the outer surface of the discharge envelope.

10. A lamp as claimed in claim 2, characterized in that the absorption layer is disposed on the inner surface of the discharge envelope and in that the luminescent layer is disposed on the side of the absorption layer facing the discharge.

11. A lamp as claimed in claim 1, characterized in that the absorption layer is disposed on the inner surface of the discharge envelope and in that the luminescent layer is disposed on the side of the absorption layer facing the discharge.

12. A lamp as claimed in claim 2, characterized in that the garnet activated by trivalent cerium is mixed with the luminescent materials of the luminescent layer and in that the luminescent layer also is the absorption layer.

13. A lamp as claimed in claim 1, characterized in that the garnet activated by trivalent cerium is mixed with the luminescent materials of the luminescent layer and in that the luminescent layer also is the absorption layer.

14. A lamp as claimed in claim 2, including a ballast unit and an ignition unit, which are arranged together with the discharge envelope in a common envelope consisting of a bottom portion comprising a cap and of an outer bulb transparent to radiation, characterized in that the absorption layer is disposed on at least parts of the surface of one or more of the ballast unit, the ignition unit and the bottom portion.

15. A lamp as claimed in claim 1, including a ballast unit and an ignition unit, which are arranged together with the discharge envelope in a common envelope consisting of a bottom portion comprising a cap and of an outer bulb transparent to radiation, characterized in that the absorption layer is disposed on at least parts of the surface of one or more of the ballast unit, the ignition unit and the bottom portion.

16. A lamp as claimed in claim 7, including at least one reflector arranged within the envelope, characterized in that the adsorption layer is disposed on at least a portion of the surface of the reflector.

17. A lamp as claimed in claim 14, including at least one reflector arranged within the envelope, characterized in that the absorption layer is disposed on at least a portion of the surface of the reflector.

18. A lamp as claimed in claim 15, including at least one reflector arranged within the envelope, characterized in that the absorption layer is disposed on at least a portion of the surface of the reflector.

* * * * *